July 29, 1941.    H. F. VICKERS    2,250,512
CONNECTING ROD LUBRICATION
Filed Sept. 28, 1938
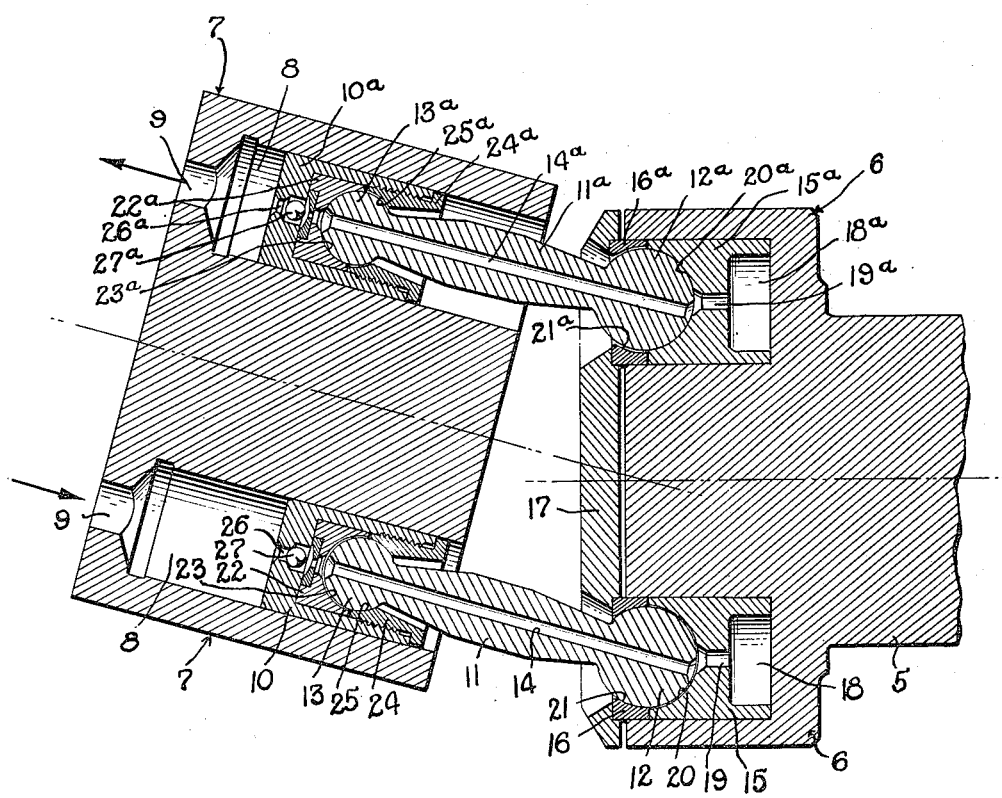
INVENTOR.
Harry F. Vickers
BY Barnes, Kisselle, Laughlin & Raisch
ATTORNEYS.

Patented July 29, 1941

2,250,512

UNITED STATES PATENT OFFICE 2,250,512

CONNECTING ROD LUBRICATION

Harry F. Vickers, Detroit, Mich., assignor to Vickers Incorporated, Detroit, Mich., a corporation of Michigan Application September 28, 1938, Serial No. 232,164

16 Claims. (Cl. 184—6)

This invention relates to variable piston displacement pumps and motors and has particularly to do with lubrication of connecting rods used in such pumps or motors.

Variable delivery pumps or motors of the type within the contemplation of the present invention are well known to the art. These variable speed devices consist generally of a rotary drive flange which is connected by universal, Cardan or double Cardan joints to a rotary cylinder block. The cylinder block is provided with cylinders spaced in a ring around the block. In each cylinder is a piston which is connected to the driving flange by a connecting rod which is swiveled or socketed at one end in a piston and at the other end in the driving flange. The driving flange and cylinder block are then disposed with their axes at an angle to provide the necessary piston displacement as the parts are rotated. The greater the angle between the flange and the block, the greater is the piston displacement.

The present invention has to do with the lubrication of the connecting rods of the above devices. Many ways have been proposed and utilized for the lubrication of these connecting rods. The present invention has for its object the provision of an improved method of lubrication which insures proper lubrication of all the wearing surfaces without the necessity of cross passageways between the rods in either the driving flange or the cylinder block.

A further object is to provide a variable piston displacement mechanism in which all contacting surfaces of the connecting rod are positively lubricated every complete revolution.

Other objects and features of the invention having to do with details of construction and operation of the device will be brought out in the following specification and claims.

In the drawing:

The single figure illustrates in cross-section the essential elements of a multiple piston pump or motor unit.

All the details of a multiple piston unit have not been shown in the drawing since these are well known to the art. It will be recognized that the unit shown may be used as a pump or a motor. For purposes of illustration it will be described as a pump.

Referring to the drawing, a driving member consists of a shaft 5 having a flange or disc 6 formed at the end thereof. A cylinder block 7 is oscillatably connected with the flange 6 by means well-known to the art (not shown). The cylinder block 7 is provided with a plurality of cylinder bores or recesses 8 having outlets 9. Slidable within the cylinders are pistons 10. For purposes of illustration two piston assemblies have been shown in the drawing, one at the top and one at the bottom of the cross-section. Identical parts have identical reference numerals but the parts in the top piston assembly have an *a* added to their identifying reference numerals to facilitate later description of the operation of the device.

Connecting rods 11 join the pistons 10 with the driving flange 6. As shown by the drawing, the connecting rods 11 are formed with a ball 12 at one end thereof and a ball 13 at the other end. An axial passageway 14 is provided through the connecting rods. In the flange 6 annularly spaced sockets or seats are provided for the ends 12 of the connecting rods. These sockets are formed by a cylindrical piece 15 and a retaining ring 16. A ring 17 serves to hold the rings 16 in position. The cylindrical pieces 15 are each provided with a lubricating chamber 18 which is connected to the socket by a passageway 19. The surface of the socket in the piece 15 will be designated 20 while the surface of the socket in the retaining ring 16 will be designated 21. Referring to the sockets in the pistons 10, a socket member 22 is provided with a bearing surface 23, and a retaining ring 24 is provided with a bearing surface 25. Between the pressure face of the pistons 10 and the connecting rod sockets therein, is provided a passageway 26 in which is located a check valve 27. It will be seen from the drawing that the ends of the passageways 14 are flared to insure proper opening to passageways 19 and 26 when the parts 6 and 7 are disposed at an angle.

In the operation: The shaft 5 and flange 6 rotate on the centerline as shown, and the cylinder block 7 rotates on the centerline, as shown. As the parts rotate the pistons reciprocate in the cylinders and serve to pump fluid by reason of this action. As indicated by the arrows in the drawing, the piston 10a at the top of the figure is on the discharge stroke and the piston 10 at the lower part of the figure is on the suction stroke. During the discharge stroke of the piston 10a, the connection rod 11a is under compression and seats tightly at the surface 20a and 23a. The discharge fluid can pass freely through the check valve 27a through the hole 14a in the connecting rod and into the lubricating chamber 18a through the passageway 19a. When the rod 11a and the attached piston assembly is rotated to the position as shown by rod 11, the rod will then be in tension, as shown in the drawing, so that the bearing surfaces 21 and 25 are operating. At this point in the rotation, there is a clearance developed between the rod 11 and the surfaces 20 and 23, as shown in exaggeration by the space between the balls 12 and 13 and the surfaces. The lubricating liquid which has been compressed in the chamber 18a during the discharge stroke now expands and, since the check valve 27 prevents the escape of the liquid into the cylinder, it will necessarily pass on to the bearing surfaces 20 and 23. As the piston rod 11 then rotates to the compression position, as first described, some of the oil on the two surfaces 20 and 23 will serve to lubricate and absorb shock from these surfaces and the excess oil will be squeezed out on to the surfaces 21a and 25a. These surfaces will then be lubricated for the forthcoming suction stroke in which the rod is in tension. It will thus be seen that all contacting surfaces of the connecting rods are lubricated every complete revolution and that this is accomplished without the necessity of interior passageways throughout the parts 6 and 7. Furthermore, this lubrication is accomplished without subjecting the bearing surfaces 21 and 25 to the high unit bearing stresses which occur when interior passages direct the full operating pressure from the high pressure side of the device to the surfaces 20 and 23.

While oil is generally known as an incompressible fluid it does compress slightly under pressure. It is the expansion of the oil after compression which is utilized in the present invention to force the oil into the bearing recesses. Consequently, in the preferred structure the chambers 18 are formed relatively large as compared with the bearing recesses to be lubricated. Other forces also act to supplement this expanding action of the oil. In case any air is trapped in the chambers 18 it will be compressed and will expand when pressure is released just as does the oil. Centrifugal forces acting on the oil in chambers 18 also tend to increase the pressure in passageways 19 to force oil into the bearing recesses. A still further force supplementing the expanding action is that due to elastic deformation of the parts which enclose the compressed body of oil.

It will be understood, of course, that the principles embodied in the present invention may be utilized by many different structural embodiments and that the particular location of the storage chambers 18 and 18a is by way of illustrating one suitable embodiment.

What I claim is:

1. In a variable piston displacement device adapted to be used as a pump or motor, a lubricating chamber in communication with bearings in said device and adapted to be furnished with compressed liquid at intervals in the operation of said device, said liquid subsequently expanding to force liquid into said bearings to lubricate the same.

2. In a variable piston displacement device adapted to be used as a pump or motor, a plurality of members connecting two relatively oscillatable parts, said members having bearing surfaces and longitudinally extending passageways, a plurality of lubricating chambers formed in said device in communication with said passageways and bearing surfaces, said passageways and chambers adapted to be furnished with compressed liquid at intervals in the operation of said device, said liquid in said chambers subsequently expanding to force a portion of the liquid in said passageways into said bearings to lubricate the same.

3. In a variable piston displacement device adapted to be used as a pump or motor, lubricating chambers in communication with bearings in said device and adapted to be furnished with compressed fluids at intervals in the operation of said device, said fluids subsequently expanding to force portions of the same into said bearings, to lubricate the same, said chambers being formed relatively large as compared with the bearing recesses with which they communicate.

4. In a hydraulic device in which two rotatable parts are oscillatably joined, one of the parts having one or more cylinder recesses, pistons in said recesses, and connecting rods between said pistons and the other of said parts, said rods being swivelled at each end in said pistons and said last named part, respectively, said rods having a longitudinally extending passageway communicating at the piston end with a passageway leading to the pressure face of the piston and communicating at the other end with lubrication chambers formed in said last named part, one chamber for each of said rods, and a check valve at the piston end of each of said passageways whereby lubricating liquid may pass from the face of said piston and be locked in said passageways and chamber during a compression stroke, subsequent expansion of said liquid causing flow from said passageways and chamber to bearing surfaces of said rods during a suction stroke.

5. In a hydraulic device in which two rotatable parts are oscillatably joined, one of the parts comprising a cylinder block having a plurality of annularly spaced cylinder bores and the other of said parts having a like plurality of seats formed therein with lubrication chambers formed adjacent each of said seats and in communication therewith, pistons slidable in said cylinder bores, piston rods connected by ball and socket joints to said pistons at one end and to said seats at the other, means for conducting lubricating liquid from a cylinder which at the moment is under high pressure to the lubrication chamber which is in communication with the piston rod seat corresponding with said cylinder, said means comprising passageways leading through said piston rods and pistons connected thereto, and a check valve in said pistons for admitting liquid under pressure to said passageways whereby liquid in the lubrication chambers will expand during suction strokes of the pistons and corresponding rods to force liquid into portions of said ball and socket joints, said liquid to be forced during a compression stroke to the remainder of the ball and socket joints.

6. In a variable piston displacement device adapted to be used as a pump or motor, a lubricating chamber in communication with bearings in said device and adapted to be furnished with compressed liquid at intervals in the operation of said device, said liquids subsequently expanding to force liquid into said bearings to lubricate the same, the volume of said chambers being predetermined in size to permit compression and expansion of a sufficient volume of liquid to form an oil film over the surfaces of said bearings.

7. In a variable piston displacement device adapted to be used as a pump or motor, a plurality of members connecting two relatively oscillatable parts, said members having bearing surfaces and longitudinally extending passageways, a plurality of lubricating chambers formed in said device in communication with said passageways and bearing surfaces, said passageways and chambers being adapted to be furnished with compressed liquid at intervals in the operation of said device, and being so dimensioned that the volume of compression of said liquid is equal to the amount of oil necessary to form an oil film on said bearing surfaces.

8. In an apparatus, relatively movable parts adapted to be intermittently placed under compression and tension and means forming a chamber spaced from, but in communication with, the bearing surfaces of the said relatively movable parts, all of said chamber and passageways connecting said chamber with said bearing surfaces being constantly filled with lubricating liquid which is intermittently compressed whereby the expansion thereof will furnish lubricating liquid to said relatively movable parts.

9. A method of lubricating relatively movable parts of a device to be lubricated which comprises establishing a body of lubricant at a point spaced from and in communication with the parts to be lubricated, intermittently compressing said body of liquid, and utilizing the expansive force of said compressed liquid to lubricate said relatively movable parts.

10. A method of lubricating relatively movable parts of a device to be lubricated which comprises establishing a body of lubricant at a point spaced from and in communication with the parts to be lubricated, compressing said body of liquid, and utilizing the expansive force of said compressed liquid to lubricate said relatively movable parts.

11. A method of lubricating relatively movable parts of a device to be lubricated which comprises establishing a body of lubricant at a point spaced from and in communication with the parts to be lubricated, compressing said body of liquid, and utilizing the expansive force of said compressed liquid to lubricate said relatively movable parts, the expansive force of said liquid being sufficient to force lubricant in between said relatively movable parts.

12. A method of lubricating relatively movable parts of a device to be lubricated which comprises establishing a body of liquid at a point spaced from, but in communication with, the parts to be lubricated, intermittently compressing said body of liquid and intermittently utilizing the expansive force of said compressed liquid to lubricate said relatively movable parts.

13. In a variable piston displacement device adapted to be used as a pump or motor, a plurality of members connecting two rotating and relatively oscillatable parts, said members having bearing surfaces and longitudinally extending passageways, a plurality of lubricating chambers formed in one of said parts in communication with said passageways and bearing surfaces, said passageways and chambers being adapted to be furnished with lubricating liquid at intervals in the operation of said device, means for admitting liquid to said passageways and chambers from a supply under pressure but arranged to prevent escape thereof to said supply, said chambers being connected to said passageways and to bearing surfaces on said parts whereby, when said parts are rotated, centrifugal forces acting on liquid in said chambers will exert pressure on liquid in said passageways to force the same onto said bearing surfaces.

14. In a hydraulic pump or motor device of the type having a plurality of cylinders and pistons forming expansible chambers and motion transmitting connections, one for each chamber, for effecting relative reciprocation between the cylinder and piston, valve means for alternately subjecting each chamber in sequence to the high and low pressure sides of the device, a bearing in each of said connections and provided with a lubricating means comprising a fluid passage extending to the bearing and communicating exclusively with the high pressure side of the device during one interval of operation and communicating exclusively with the low pressure side of the device during a second interval of operation, each passage having sufficient volume to store a significantly greater quantity of fluid when under high pressure than when under low pressure, and means for resisting the return of fluid from said passage to the low pressure side during said second interval whereby at least a portion of said greater volume is discharged through said bearing during the second interval and when the bearing is relieved of load.

15. In a hydraulic pump or motor device of the type having a plurality of cylinders and pistons forming expansible chambers and motion transmitting connections, one for each chamber, for effecting relative reciprocation between the cylinder and piston, valve means for alternately subjecting each chamber in sequence to the high and low pressure sides of the device, a bearing in each of said connections, means forming a reservoir for fluid under pressure and in constant communication with said bearing, and means for intermittently admitting fluid from the high pressure side of the device to said reservoir to recharge said reservoir and for cutting off such admission of fluid during a period while the bearing is relieved of load to thereby deliver fluid under pressure to the bearing.

16. The method of lubricating a bearing in an expansible chamber device which bearing is subject to intermittent loading under greater unit pressure than the operating pressure of the device which comprises storing of a body of lubricating fluid in communication with the bearing and intermittently during periods while the bearing is under load exposing said body to the operating pressure of said device to thereby store energy in said body, and during periods while the bearing is relieved of load relieving such energy by diverting a portion of the fluid in said body through said bearing.

HARRY F. VICKERS.